United States Patent Office 3,262,797
Patented July 26, 1966

3,262,797
REFRACTORY SHAPES
Ben Davies, Pittsburgh, Pa., assignor to Harbison-Walker Refractories Company, Pittsburgh, Pa., a corporation of Pennsylvania
No Drawing. Filed May 18, 1965, Ser. No. 456,838
5 Claims. (Cl. 106—58)

This application is a continuation-in-part of copending application Serial No. 226,155 filed September 25, 1962, but now abandoned in favor of the present application, entitled "Refractory Shapes" by Ben Davies and owned by a common assignee.

This invention concerns refractory brick and batches for making refractory brick.

Refractory shapes may be termed chemically bonded or ceramically bonded. The chemically bonded shapes are green or unfired shapes, and are put into service in this form, whereas ceramically bonded shapes are shapes which have been subjected to elevated burning or firing temperatures to obtain a ceramic bond through the particulate matter which makes up the shape.

In both chemically and ceramically bonded shapes, the bond itself is probably the most important single property. In order to obtain a shape which is easily handled and which stands up in service without spalling, peeling, or breaking away, the bond must be strong and relatively stable. For certain uses, high density and low porosity are equally important properties. These latter properties are desirable in a shape to resist penetration by corrosive metallurgical slags and fumes which tend to destroy the shapes in service.

It has long been known that one of the strongest types of refractory, having the highest density and lowest porosity, is one fabricated entirely of a fusion of the constituents which make up the refractory; and many fused cast refractories are now commercially available.

The manufacture of fused shapes is complicated and expensive, and a distressing amount of culls or reject shapes is commonplace. Many attempts have been made to utilize these culls to advantage, since they represent a relatively large investment in material and labor. It has been suggested that they be comminuted and intermixed with subsequent charges to the fusion process. However, this is extremely expensive because of the very hard character of some fusions, and the necessity of fine subdivision before the cull material can be reused. For example, in one plane manufacturing fusion cast basic shapes and in which the culls from the fusion process are comminuted for subsequent intermixing for charging to the fusion vessel, it is not uncommon to wear away the steel working parts of a mill each day to such an extent as to take the mill off the line.

Others have suggested that the culls of a fusion process need not be reduced to such a degree of fine subdivision, but need merely be reduced to a grog particle size to produce a coarse grain for subsequent use in the fabrication of pressed, chemically bonded or ceramically bonded refractory shapes. However, these latter processes have not been completely satisfactory, because good bond formation has been elusive.

It has been suggested in United States Patent No. 2,937,101, that fused magnesia grain bonded with phosphoric acid and in United States Patent No. 3,030,228, bonding electrically-fused magnesia grain with tar, and subjecting it to a subsequent baking and sintering treatment is proposed. The two foregoing patents are most accurately described as disclosing chemically bonded shapes.

It is an object of this invention to provide an improved ceramically bonded shape fabricated from fused refractory grain.

According to one aspect of the present invention we provide a brick batch consisting of a first fraction which constitutes from 40 to 70% of the batch, which is substantially all +65 mesh and which consists substantially entirely of fused magnesite, chrome ore, alumina or fused mixtures thereof, and a second fraction all of which passes a 28 mesh screen and which consists of magnesia, chrome ore or mixtures thereof, the batch containing, on the basis of an oxide analysis, both MgO and $Cr_2O_3$.

According to a further aspect of the invention we provide a burned basic refractory brick made from a batch as defined above.

Preferred embodiments of the invention are hereinafter particularly described, by way of illustration only, in the following examples.

In fabricating a brick from the foregoing mix, the ingredients were intimately dry mixed for about five minutes, then for an additional five minutes with about 4%, by weight, based on the total weight of the batch ingredients, of tempering fluid comprised of water and waste lignin liquor (in a weight ratio of about 1 to 3). Brick were pressed at 6000 p.s.i., dried in air overnight, and then overnight at 250° F., and burned at cone 23.

Example I

A typical detailed screen analysis for a brickmaking batch is as follows:

| | Percent |
|---|---|
| Pass 4 on 10 mesh | 18 |
| Pass 10 on 28 mesh | 26 |
| Pass 28 on 65 mesh | 11 |
| —28 mesh | 56 |

Of that fraction passing a 28 mesh screen, 45% passed 150 mesh screen and 70% thereof was —325 mesh. It should be noted that about 44% of the total mix, i.e. +28 mesh, was fused grain.

The fused grain is composed of from 20 to 70% low silica chrome ore and 80 to 30% of high purity magnesite, and obtained by electric fusion. The fine fraction of the batch is composed of high purity magnesite, low silica chrome ore, or mixtures thereof. The total chrome ore in a brick made from such a batch preferably constitutes about 30%, by weight, of the mix, but workable limits are from 20 to 40%. Brick made according to the foregoing teaching exhibit much higher spalling resistance than brick of comparable composition, where all of the chrome ore is added in the sintered or fused grain, and considerably better spalling resistance than their burned counterparts without the benefit of fused coarse grain. Also, the brick are much easier to manufacture, as compared to those in which all the chrome ore is added as raw chrome ore.

A typical fused magnesia had a bulk specific gravity of about 3.41 (theoretical BSG is 3.58). The analysis of the fused magnesia grain was about 97%, by weight, MgO with about 3% (by difference) $SiO_2$, $Al_2O_3$, $Fe_2O_3$ and CaO, constituting the remainder. A typical deadburned magnesite had an analysis, by weight, 95% MgO, 1.5% CaO, 2.8% $SiO_2$, and .7% (by difference) $Al_2O_3$ and $Fe_2O_3$.

One of the primary reasons for increased facility of manufacture is that the use of fused grain, is instrumental in obtaining much better direct bonding with the fine fraction of the mix. This becomes clear when one understands that chrome ore and magnesia are extremely different both chemically and mineralogically, and do not easily ceramically bond to each other. Prior basic brick fabricated of chrome ore and magnesia have relied to a large extent on silicate filming and formation of forsterite between the interstices of the chrome ore and magnesia grain to obtain good bonding. However, in the brick of the present invention, wherein a portion of the mix has been fused, the resulting grain has good chemical and mineralogical compatibility with the fines fraction whether it be magnesia, chrome ore, or mixtures thereof.

*Example II*

Fused grain made from a fusion comprised of about 15 parts Philippine chrome ore, about 10 parts alumina, and about 35 parts magnesite, having a bulk specific gravity of 3.57 and a calculated porosity of 6.3% was crushed, and a —4 +28 mesh fraction separated from the crushed product. The —4 +28 mesh fraction constituted about 65% of a brick batch. The other 35% of the batch consisted of ball milled, high purity dead burned magnesite (—28 mesh). Brick were made from the foregoing batch and burned at cone 30. Microscopic examination of the burned brick indicated that the fused grain itself consisted of interlocking chrome spinel and periclase crystals. The periclase crystals had sintered to the fine particles of magnesite to form a substantially continuous bond throughout the brick. The brick had a modulus of rupture of 1080 p.s.i., and had no linear change after a 3140° F. re-heat. In a load test under 25 p.s.i. pressure, the brick did not fail at 3300° F. The thermal stability of the brick was unusually good.

Typical analyses of the materials used in the foregoing example are as follows: Philippine chrome ore consisted of 29% $Al_2O_3$, 32.1% $Cr_2O_3$, 18.8% MgO, 5.5% $SiO_2$, 12.6% FeO, 0.6% CaO and ignition loss of 1%. The magnesite used consisted of about 98% MgO, and about 2% $SiO_2$, $Al_2O_3$, $Fe_2O_3$ and CaO, by difference. The alumina analysed about 99% $Al_2O_3$, with about 1% trace impurities. The foregoing analyses are all by weight, and on the basis of an oxide analysis.

Thus, it can be seen from the foregoing examples that excellent ceramically bonded basic refractory shapes are produced and that the culls of basic fusion processes are utilised economically. Further, since the culls need only be relatively coarsely comminuted, considerable savings are made in comminution steps. As noted in Example II, microscopic studies were made of burned brick. Generally, the burned brick may be microscopically characterized as fused grain being interlocking chrome spinel and periclase crystals; and, in which the constituents of the fine fraction are sintered to similar crystals in the fused grain to form a substantially continuous bond throughout the brick, i.e. chrome fines sintered to chrome spinel, and magnesia fines sintered to periclase crystals.

While straight magnesite fused grain and fused grain made from a mixture of chrome ore, alumina, and magnesia are discussed above, it should be understood that fused grains consisting of just chrome ore, or magnesia are amenable to the teachings of this invention.

In the foregoing discussion, a 28 mesh screen was discussed as delineating the coarse fraction of the mixes. It should be understood that some variation is acceptable. While we find it essential that the major part of the fused grain should rest on a 28 mesh screen, a small portion of the particles passing a 28 mesh screen would not vitiate the invention. Thus, whilst +28 mesh is, in essence, the optimum sizing for the fused grain up to about 10% thereof could pass the 28 mesh screen. However, in no case should any appreciable percentage of the fused grain pass a 65 mesh screen. The workable range of coarse to fine fractions is from 40 to 70%, by weight, coarse (usually —4 +28 mesh), and from 60 to 30% complementally, by weight, fines (—28 mesh).

In the foregoing discussion, all mesh sizes are according to the Tyler series and all parts and percentages are by weight. The chemical analyses are all on the basis of an oxide analysis in conformity with the common practice in reporting the chemical content of refractory materials and the various chemical constituents are reported as though they were present as the simple oxides. For example, 1%, by weight, of silicon would be reported as 2.14% silicon dioxide.

Having thus described the invention in detail and with sufficient particularity as to enable those skilled in the art to practice it, what is desired to have protected by Letters Patent is set forth in the following claims.

I claim:

1. A refractory brickmaking size graded brick batch consisting essentially of a relatively coarse fraction which constitutes from 40 to 70%, by weight, of the batch, which is substantially all +65 mesh, and which is a fused grain made by melting a mixture which is, by weight, 20 to 70% low silica chrome ore and 80 to 30% magnesite, and a second fraction all of which passes a 28 mesh screen and which consists of dead burned magnesia, chrome ore, and mixtures thereof, up to about 10% of the fused grain passing a 28 mesh screen but substantially no fused grain being 65 mesh.

2. The brick batch of claim 1 in which about 45% of the fine fraction passes a 150 mesh screen, and the major portion thereof passing a 325 mesh screen.

3. The brick batch of claim 1 in which the chrome ore constitutes about 30%, by weight, of the entire batch.

4. A burned basic refractory brick made from a refractory brickmaking size graded brick batch consisting essentially of a relatively coarse fraction which constitutes from 40 to 70%, by weight, of the batch, which is substantially all +65 mesh, and which is a fused grain made by melting a mixture which is, by weight, 20 to 70% low silica chrome ore and 80 to 30% magnesite, and a second fraction of all which passes a 28 mesh screen and which consists of dead burned magnesia, chrome ore, and mixtures thereof, up to about 10% of the fused grain passing a 28 mesh screen but substantially no fused grain being —65 mesh, said brick microscopically characterized by coarser grains of interlocking chrome spinel and periclase crystals and in which the matrix constituents are sintered to chemically similar constituents of the coarser grain.

5. A burned basic refractory brick made from a refractory brickmaking batch consisting of a relatively coarse fraction substantially entirely consisting of fused grain of material (1) selected from the group consisting essentially of magnesia, chrome ore, and mixtures thereof, and (2) alumina, and a relatively fine fraction of material consisting essentially of dead burned magnesia, chrome ore and mixtures thereof, said relatively coarse fraction of fused grain substantially all passing a 4 mesh screen and resting on a 65 mesh screen but no more than about 10% of the fused grain passing a 28 mesh screen and resting on a 65 mesh screen, the remainder of the batch which constitutes the fine fraction all passing a 28 mesh screen, said coarse fraction constituting from about 40 to 70% by weight of the batch, said burned brick microscopically characterized by periclase crystals and chrome spinel in the fused grain in sintered bonded relation with particles of magnesia and chrome ore, respectively, in the fines.

References Cited by the Examiner

UNITED STATES PATENTS 3,030,228    4/1962    Hernandez et al.    101—58
3,116,156    12/1963    Charvat    106—59
3,210,206    10/1965    Davies et al.    106—59

TOBIAS E. LEVOW, *Primary Examiner.*

J. E. POER, *Assistant Examiner.*